United States Patent
Katayama

(10) Patent No.: US 11,767,787 B2
(45) Date of Patent: Sep. 26, 2023

(54) CATALYST EARLY ACTIVATION CONTROL AT COLD ENGINE START

(71) Applicant: TOYOTA JIDOSHA KABUSHIKI KAISHA, Toyota (JP)

(72) Inventor: Akihiro Katayama, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/049,340

(22) Filed: Oct. 25, 2022

(65) Prior Publication Data

US 2023/0193815 A1 Jun. 22, 2023

(30) Foreign Application Priority Data

Dec. 20, 2021 (JP) .................................. 2021-206380

(51) Int. Cl.
| | | |
|---|---|---|
| *F02B 37/18* | (2006.01) | |
| *F01N 3/20* | (2006.01) | |
| *F02D 41/00* | (2006.01) | |
| *F02D 41/22* | (2006.01) | |

(52) U.S. Cl.
CPC .......... *F02B 37/183* (2013.01); *F01N 3/2006* (2013.01); *F02D 41/0007* (2013.01); *F02D 41/221* (2013.01); *F02D 2200/0406* (2013.01)

(58) Field of Classification Search
CPC ............... F02D 41/0007; F02D 41/221; F02D 2200/0406; F01N 3/2006; F02B 37/183
See application file for complete search history.

(56) References Cited

U.S. PATENT DOCUMENTS

| | | | | |
|---|---|---|---|---|
| 6,687,601 B2 * | 2/2004 | Bale | ....................... | F02M 26/48 73/114.76 |
| 7,631,552 B2 * | 12/2009 | Keski-Hynnila | ..... | G01M 15/05 73/114.74 |
| 7,788,922 B2 * | 9/2010 | Muller | .................... | F02B 37/18 60/602 |
| 8,631,691 B2 * | 1/2014 | Tanaka | .................. | F02M 26/46 73/114.74 |

(Continued)

FOREIGN PATENT DOCUMENTS

| | | | | |
|---|---|---|---|---|
| JP | 2006348757 A | * | 12/2006 | ............ Y02T 10/40 |
| JP | 5196036 B2 | | 5/2013 | |

(Continued)

OTHER PUBLICATIONS

WO-2011077517-A1, translation, Feb. 11, 2023 (Year: 2023).*
JP-2006348757-A, translation, Feb. 11, 2023 (Year: 2023).*
WO-2017126277-A1. translation, Feb. 11, 2023 (Year: 2023).*

*Primary Examiner* — J. Todd Newton
(74) *Attorney, Agent, or Firm* — Oblon, McClelland, Maier & Neustadt, L.L.P.

(57) ABSTRACT

An ECM executes a catalyst early activation control at cold start of an engine such that the activation of a catalyzer is promoted by opening a WGV. Further, the ECM performs a diagnosis process of, during execution of the catalyst early activation control, repeating opening and closing of the WGV with a given period and diagnosing whether or not the WGV is stuck, based on whether or not a fluctuation component with the same period as the period of the opening and closing of the WGV is included in output from an intake manifold pressure sensor during the repetition.

5 Claims, 5 Drawing Sheets

(56) References Cited

U.S. PATENT DOCUMENTS

| | | | | |
|---|---|---|---|---|
| 9,115,672 B2 * | 8/2015 | Miyashita | ............... | F02M 26/10 |
| 2002/0144674 A1 * | 10/2002 | Wang | ................... | F02D 41/0065 |
| | | | | 123/568.21 |
| 2003/0182048 A1 * | 9/2003 | Wang | ....................... | G05B 9/02 |
| | | | | 701/107 |
| 2005/0066658 A1 * | 3/2005 | Longnecker | ........... | F02M 26/05 |
| | | | | 60/602 |
| 2006/0248889 A1 * | 11/2006 | Sagisaka | ............... | F02D 41/221 |
| | | | | 60/605.1 |
| 2009/0048802 A1 * | 2/2009 | Wang | .................... | F02D 41/145 |
| | | | | 702/138 |
| 2009/0094009 A1 * | 4/2009 | Muller | .................... | G06F 30/20 |
| | | | | 703/7 |
| 2012/0209496 A1 * | 8/2012 | Miyashita | ............... | F02M 26/10 |
| | | | | 701/102 |
| 2018/0258817 A1 * | 9/2018 | Kosuge | ............... | F02D 41/0007 |

FOREIGN PATENT DOCUMENTS

| | | | | |
|---|---|---|---|---|
| JP | 2018-145914 A | | 9/2018 | |
| WO | WO-2011077517 A1 * | 6/2011 | ............... | F02B 37/18 |
| WO | WO-2017126277 A1 * | 7/2017 | ........... | F01D 17/105 |

* cited by examiner

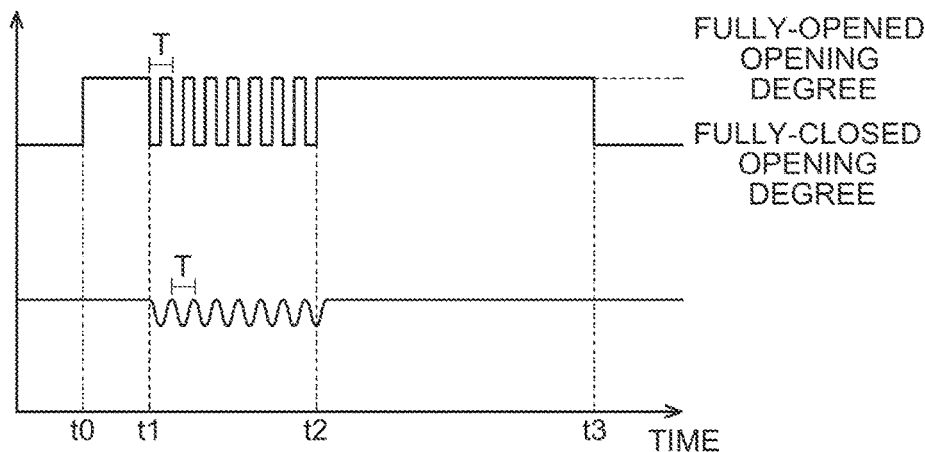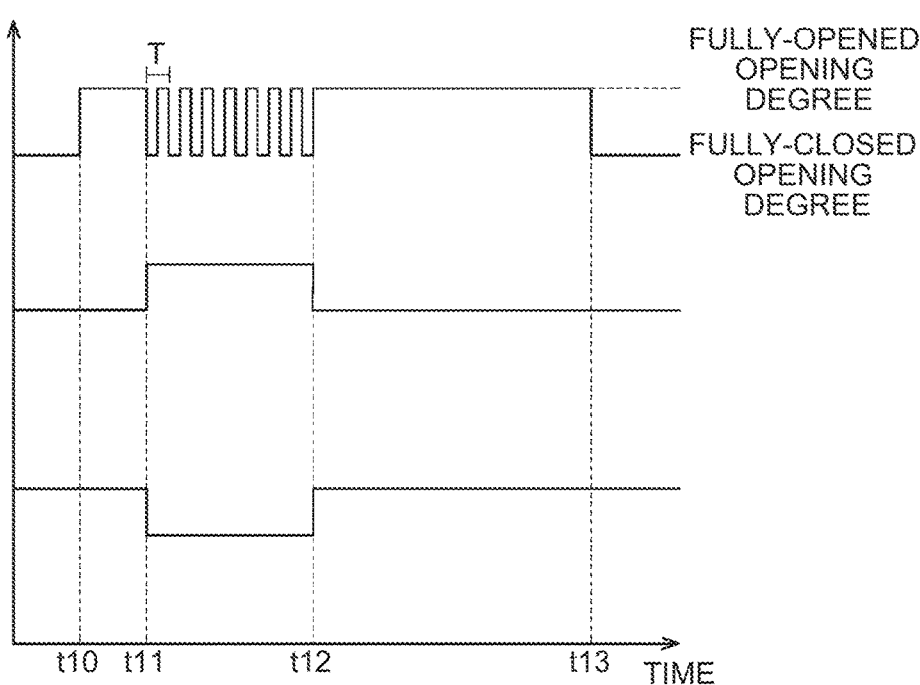

CATALYST EARLY ACTIVATION CONTROL AT COLD ENGINE START

CROSS-REFERENCE TO RELATED APPLICATION

This application claims priority to Japanese Patent Application No. 2021-206380 filed on Dec. 20, 2021, incorporated herein by reference in its entirety.

BACKGROUND

1. Technical Field

The present disclosure relates to an engine control device for controlling an engine including a turbocharger.

2. Description of Related Art

Some turbochargers include a bypass passage through which exhaust gas flows to detour around a turbine and a wastegate valve configured to open and close the bypass passage. Japanese Unexamined Patent Application Publication No. 2018-145914 (JP 2018-145914 A) describes an engine control device for controlling an engine including a turbocharger provided with a bypass passage and a wastegate valve. The engine control device described in JP 2018-145914 A opens the wastegate valve at cold start of the engine to execute a catalyst early activation control by which a catalyzer is activated at an earlier timing. When the wastegate valve is opened, exhaust gas intensively hits part of the catalyzer. On this account, a part where a catalyst is activated is formed earlier than a case where the exhaust gas is equally blown against the whole catalyzer. Accordingly, by executing the catalyst early activation control, it is possible for the catalyzer to start to clean the exhaust gas earlier.

SUMMARY

However, during a stop of the engine, the wastegate valve might be stuck. In a case where the wastegate valve is stuck as such, even when the wastegate valve is instructed to be opened, the wastegate valve does not open. Accordingly, the catalyst early activation control cannot be executed appropriately. On this account, at the time of execution of the catalyst early activation control, it is desirable to check in advance that the wastegate valve is not stuck. In view of this, before the start of the catalyst early activation control, it is conceivable to diagnose whether or not the wastegate valve is stuck. However, in such a case, just by the time required for the diagnosis, the start of the catalyst early activation control is delayed, and eventually, the timing when the catalyzer starts to clean exhaust gas is delayed.

An engine control device accomplished to achieve the above object is an engine control device for controlling an engine. The engine includes a combustion chamber, an intake passage, an exhaust passage, a turbocharger, a bypass passage, a wastegate valve, a catalyzer, and an intake pressure sensor. In the combustion chamber, combustion of fuel-air mixture is performed. The intake passage is an introduction passage for intake air to the combustion chamber. The exhaust passage is a discharge passage for exhaust gas from the combustion chamber. The turbocharger includes a turbine provided in the exhaust passage and a compressor provided in the intake passage. The bypass passage branches off from the exhaust passage at a part of the exhaust passage on an upstream side from the turbine and merges with the exhaust passage at a part of the exhaust passage on a downstream side from the turbine. The wastegate valve is configured to open and close the bypass passage. The catalyzer is configured to clean the exhaust gas. The catalyzer is provided in a part of the exhaust passage, the part being on the downstream side from a merging position where the bypass passage merges with the exhaust passage. The intake pressure sensor is configured to detect a pressure of the intake air in a part of the intake passage on the downstream side from the compressor. The engine control device executes the followings: a catalyst early activation control at cold start of the engine such that the catalyzer is promoted to be activated by opening the wastegate valve; and a diagnosis process of, during execution of the catalyst early activation control, instructing the wastegate valve to repeat opening and closing with a given period and diagnosing whether or not the wastegate valve is stuck, based on whether or not a fluctuation component with the given period is included in output from the intake pressure sensor during the instruction.

The engine control device executes the catalyst early activation control at cold start of the engine such that the catalyzer is promoted to be activated by opening the wastegate valve. When the wastegate valve is opened, exhaust gas is intensively blown against part of the catalyzer. On this account, a part where a catalyst is activated is formed earlier than a case where the exhaust gas is equally blown against the whole catalyzer.

During the execution of the catalyst early activation control, the engine control device instructs the wastegate valve to repeat opening and closing with a given period. When the opening degree of the wastegate valve is changed, the exhaust-gas flow rate of the turbine changes, so that supercharging efficiency of the compressor changes. Due to the change in the supercharging efficiency, the pressure of the intake air in a part of the intake passage on the downstream side from the compressor changes. Accordingly, in a case where the wastegate valve works normally and repeats the opening and closing as instructed, an intake pressure fluctuation with the same period as the period of the opening and closing occurs. In the meantime, in a case where the wastegate valve is stuck and does not repeat the opening and closing as instructed, the intake pressure fluctuation with the same period as the period of the opening and closing does not occur. Accordingly, it is possible to diagnose whether or not the wastegate valve is stuck, based on whether or not a fluctuation component with the same period as the period of the opening and closing is included in the output from the intake pressure sensor during the instruction of the repetition of the opening and closing.

When blowing of the exhaust gas against an activation promoted part in the catalyst early activation control is stopped during the diagnosis on whether or not the wastegate valve is stuck, the activation of the catalyst is delayed. In this respect, in the engine control device, the diagnosis on whether or not the wastegate valve is stuck is performed while the opening and closing of the wastegate valve is repeated. On that account, even during the diagnosis on whether or not the wastegate valve is stuck, the blowing of the exhaust gas against the activation promoted part in the catalyst is not completely stopped. Accordingly, even during the execution of the diagnosis process, it is possible to continue the catalyst early activation control.

Note that the diagnosis on whether or not the wastegate valve is stuck in the engine control device can be performed in the following manner, for example. The engine control device may include a bandpass filter configured to extract a fluctuation component with the same period as the period of the opening and closing from the output from the intake pressure sensor. The diagnosis process may be performed to diagnose whether or not the wastegate valve is stuck, based on whether or not an amplitude of the output from the intake pressure sensor to which the bandpass filter is applied is equal to or more than a given determination value.

In the engine control device, an intake-amount increase control may be executed during execution of the diagnosis process such that an intake amount of the engine is increased. When the intake amount is increased, the flow rate of the exhaust gas increases. Accordingly, a large difference occurs in the blowing amount of the exhaust gas to be blown against an air-fuel-ratio sensor between a case where the wastegate valve is normally opened and a case where the wastegate valve is stuck closed. This accordingly makes it possible to improve the accuracy in diagnosis on whether or not the wastegate valve is stuck closed.

In a case where the intake-amount increase control is executed, the engine control device may be configured as follows. That is, the diagnosis process may include a first diagnosis process of diagnosing whether or not the wastegate valve is stuck in a state where the intake-amount increase control is not executed, and a second diagnosis process of diagnosing whether or not the wastegate valve is stuck in a state where the intake-amount increase control is executed. The second diagnosis process may be performed after the first diagnosis process. In a case where the diagnosis process is performed in a state where the intake-amount increase control is executed, the accuracy in diagnosis improves. However, fuel-efficiency performance or exhaust performance of the engine might decrease. On this account, first, the diagnosis should be performed without executing the intake-amount increase control, and in a case where a diagnosis result cannot be determined by that, the diagnosis should be performed by executing the intake-amount increase control.

Note that, in a case where the intake-amount increase control is executed, the engine control device may be provided in a hybrid electric vehicle including a generator motor drivingly connected to the engine. The engine control device may control a driving force to drive the hybrid electric vehicle through torque adjustment of both of the engine and the generator motor. In that case, the engine control device may execute a torque absorption control during execution of the intake-amount increase control such that an increased amount in torque of the engine due to the intake-amount increase control is at least partially absorbed by the torque adjustment of the generator motor. When the intake amount of the engine is increased, the engine torque increases. Accordingly, when the torque absorption control is executed together with the intake-amount increase control, an increased amount in the engine torque due to the intake-amount increase control is prevented from being directly reflected on the driving force to drive the hybrid electric vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 5A is a time chart illustrating the transition of the opening degree of the wastegate valve when the engine control device executes the catalyst early activation control;

FIG. 5B is a time chart illustrating the transition of output from an intake manifold pressure sensor after a bandpass filter is applied to the intake manifold pressure sensor, when the engine control device executes the catalyst early activation control;

FIG. 6A is a time chart illustrating the transition of the opening degree of a wastegate valve when an engine control device according to a second embodiment performs a diagnosis process;

FIG. 6B is a time chart illustrating the transition of an intake amount when the engine control device according to the second embodiment performs the diagnosis process;

FIG. 6C is a time chart illustrating the transition of MG torque when the engine control device according to the second embodiment performs the diagnosis process.

DETAILED DESCRIPTION OF EMBODIMENTS

First Embodiment

A first embodiment of an engine control device will be described below in detail with reference to FIGS. 1 to 5A, 5B.

Configuration of Engine Control Device

Figure 1:
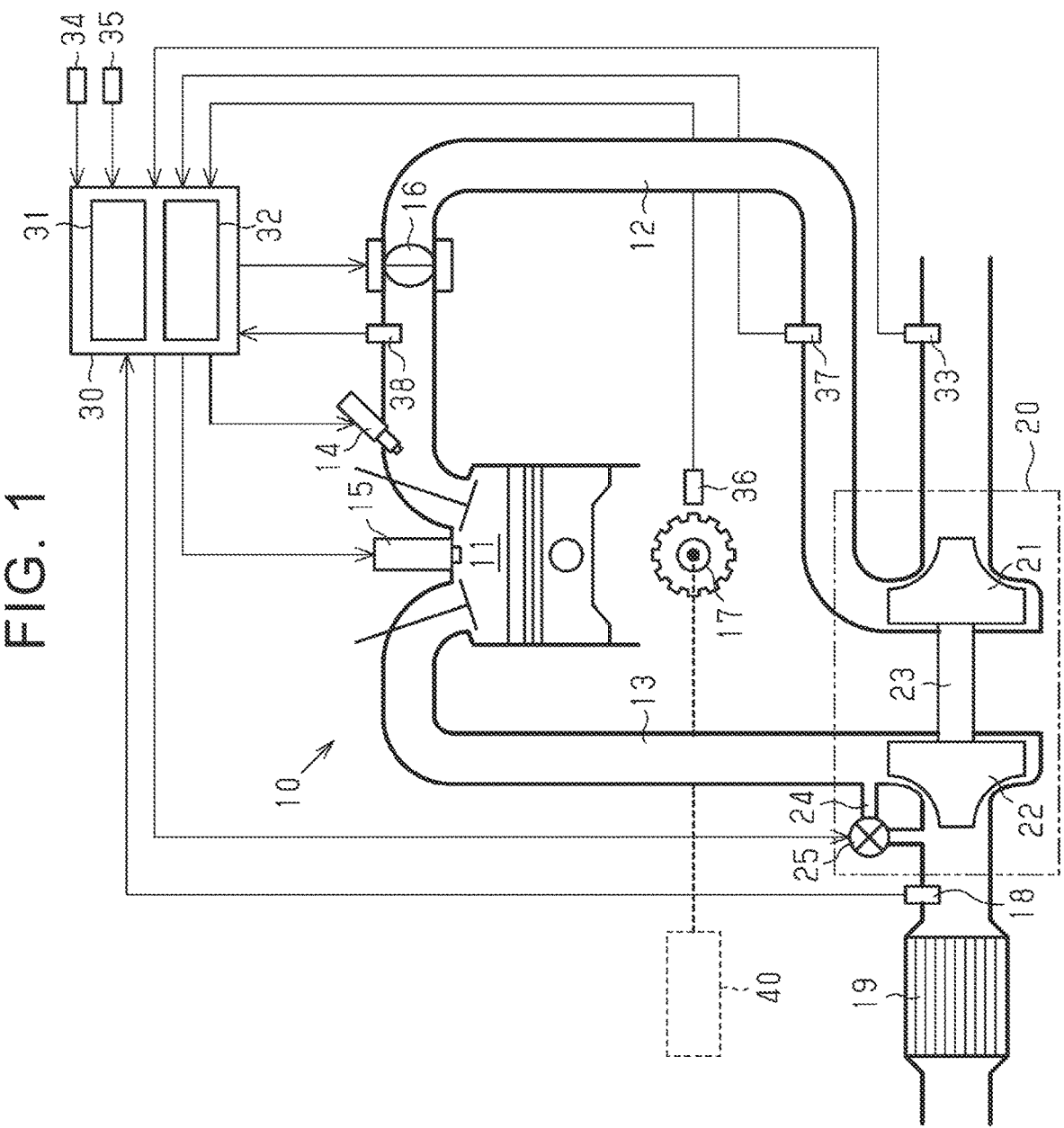
FIG. 1 is a view schematically illustrating a configuration of an engine control device according to a first embodiment.

With reference to FIG. 1, the configuration of the engine control device according to the present embodiment will be described first. An engine 10 to which the engine control device of the present embodiment is applied includes a combustion chamber 11 in which fuel-air mixture is burnt. Further, the engine 10 includes an intake passage 12 as an introduction passage for intake air to the combustion chamber 11, and an exhaust passage 13 as a discharge passage for exhaust gas from the combustion chamber 11. The engine 10 includes an injector 14 configured to inject fuel during intake of air to be introduced into the combustion chamber 11, and an ignition device 15 configured to ignite the fuel-air mixture in the combustion chamber 11 by spark discharge. A throttle valve 16 is provided in a part of the intake passage 12 on the downstream side from a compressor 21. The throttle valve 16 adjusts the amount of the intake air to be introduced into the combustion chamber 11 in response to changes in the opening degree. The engine 10 generates a driving force to drive a vehicle by rotating a crankshaft 17 by combustion of the fuel-air mixture in the combustion chamber 11.

The engine 10 includes a turbocharger 20. The turbocharger 20 includes the compressor 21 provided in the intake passage 12, and a turbine 22 provided in the exhaust passage 13. The compressor 21 is an impeller configured to compress the intake air by rotation. The turbine 22 is an impeller configured to rotate by receiving the flow of exhaust gas. The compressor 21 is connected to the turbine 22 via a turbine shaft 23. Hereby, the compressor 21 rotates in conjunction with the rotation of the turbine 22. Further, the exhaust passage 13 is provided with a bypass passage 24 as a passage through which the exhaust gas flows by detouring around the turbine 22. The bypass passage 24 branches off from the exhaust passage 13 at a part of the exhaust passage 13 on the upstream side from the turbine 22. The bypass passage 24 merges with the exhaust passage 13 at a part of the exhaust passage 13 on the downstream side from the turbine 22. A wastegate valve (WGV) 25 configured to open and close the bypass passage 24 is provided at a merging portion of the bypass passage 24 that merges with the exhaust passage 13.

The exhaust passage 13 is provided with an air-fuel-ratio sensor 18 as a sensor configured to detect the air-fuel ratio of the fuel-air mixture burnt in the combustion chamber 11. The air-fuel-ratio sensor 18 is provided in a part of the exhaust passage 13 that is on the downstream side from the turbine 22 and on the downstream side from the merging position where the bypass passage 24 merges with the exhaust passage 13. Further, the exhaust passage 13 is provided with a catalyzer 19 on which a catalyst for cleaning exhaust gas such as a three-way catalyst is carried. The catalyzer 19 is provided in a part of the exhaust passage 13 that is on the downstream side from the air-fuel-ratio sensor 18.

The engine 10 is controlled by an engine control module (ECM) 30 as the engine control device. The ECM 30 includes a processing device 31 and a storage device 32. In the storage device 32, a program and data for engine control are stored. The processing device 31 controls the engine 10 by reading the program from the storage device 32 and executing the program. Detection results from various sensors configured to detect the driving condition of the engine 10 are input into the ECM 30. The sensors the detection results of which are input into the ECM 30 include an air flow meter 33, an intake-air temperature sensor 34, a coolant temperature sensor 35, a crank angle sensor 36, a boost pressure sensor 37, and an intake manifold pressure sensor 38 in addition to the air-fuel-ratio sensor 18. The air flow meter 33 is a sensor configured to detect an intake-air flow rate GA as the flow rate of the intake air flowing through the intake passage 12. The intake-air temperature sensor 34 is a sensor configured to detect an intake-air temperature THA that is the temperature of the intake air taken into the intake passage 12. The coolant temperature sensor 35 is a sensor configured to detect an engine water temperature THW as the temperature of the coolant in the engine 10. The crank angle sensor 36 is a sensor configured to detect a crank angle CRNK as the rotation angle of the crankshaft 17. The boost pressure sensor 37 is a sensor configured to detect a boost pressure PB that is a pressure of the intake air in a part of the intake passage 12 that is placed on the downstream side from the compressor 21 and on the upstream side from the throttle valve 16. The intake manifold pressure sensor 38 is a sensor configured to detect an intake manifold pressure PM that is a pressure of the intake air in a part of the intake passage 12 that is placed on the downstream side from the throttle valve 16. Based on the detection results from these sensors, the ECM 30 controls the fuel injection amount and the fuel injection timing of the injector 14, the ignition timing of the ignition device 15, the opening degrees of the throttle valve 16 and the WGV 25, and so on.

Catalyst Early Activation Control

The ECM 30 executes a catalyst early activation control at cold start of the engine 10 such that the activation of a catalyzer 19 is promoted by opening the WGV 25. Further, the ECM 30 performs a diagnosis process of diagnosing whether or not the WGV 25 is stuck closed, during the execution of the catalyst early activation control. Note that, in the following description, an opening degree of the WGV 25 at the time when the WGV 25 shuts off the circulation of the exhaust gas through the bypass passage 24 is referred to as a fully-closed opening degree. Further, an opening degree of the WGV 25 that has a maximum value within a control range of the opening degree of the WGV 25 is referred to as a fully-opened opening degree. An opening degree of the WGV 25 that is larger than the fully-closed opening degree and smaller than the fully-opened opening degree is referred to as an intermediate opening degree.

Figure 2:
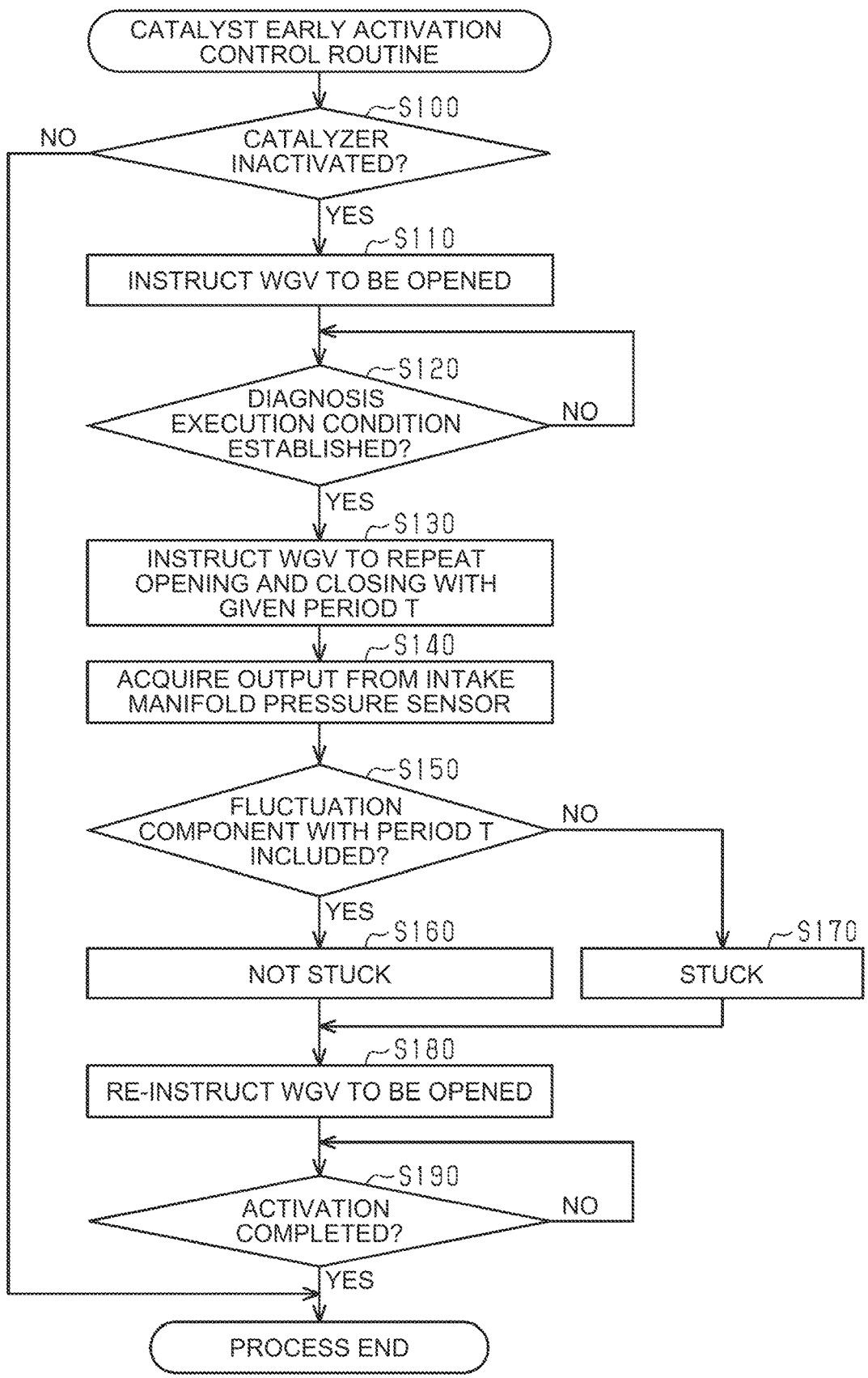
FIG. 2 is a flowchart illustrating the procedure of a catalyst early activation control to be executed by the engine control device.

FIG. 2 illustrates the procedure of a catalyst early activation control routine to be executed by the ECM 30 executes after the engine 10 has been started. When the routine is started, the ECM 30 first determines in step S100 whether or not the catalyzer 19 is in a non-active state. In the present embodiment, this determination is performed based on the intake-air temperature THA and the engine water temperature THW at the time of engine start. In a case where the ECM 30 determines that the catalyzer 19 is in a non-active state (YES), the ECM 30 advances the process to step S110. In the meantime, in a case where the catalyzer 19 has been already activated at this point like hot start of the engine 10 (NO), the ECM 30 just ends the process of this routine.

When the process proceeds to step S110, the ECM 30 gives a valve-opening command to the WGV 25 in step S110. This valve-opening command is a command to instruct the WGV 25 to keep its given opening degree, e.g., the fully-opened opening degree. After that, the ECM 30 waits for establishment of a diagnosis execution condition (S120: YES) and advances the process to step S130. The diagnosis execution condition is that the engine revolution speed or the engine load factor is stable, for example.

When the diagnosis execution condition is established and the process proceeds to step S130, the ECM 30 instructs the WGV 25 to repeat opening and closing with a given period T in step S130. Subsequently, the ECM 30 acquires output from the intake manifold pressure sensor 38 for a given period of time in step S140. Then, the ECM 30 determines, in step S150, whether or not a fluctuation component with the period T is included in the output from the intake manifold pressure sensor 38 that is acquired in step S140. In a case where the fluctuation component with the period T is included in the output from the intake manifold pressure sensor 38 (YES), the ECM 30 diagnoses, in step S160, that the WGV 25 is not stuck. In the meantime, in a case where the fluctuation component with the period T is not included in the output from the intake manifold pressure sensor 38 (NO), the ECM 30 diagnoses, in step S170, that the WGV 25 is stuck. Note that, when the ECM 30 diagnoses that the WGV 25 is stuck (S170), the ECM 30 executes an abnormality handling process to handle the sticking. Examples of the abnormality handling process include a process of notifying a user of the occurrence of an abnormality by lighting of an indicator, or the like, and a process of restricting output from the engine 10. Note that, in the present embodiment, the processes of steps S130 to S170 in FIG. 2 correspond to the diagnosis process.

In the present embodiment, the determination in step S160 is performed in the following manner. That is, at the time when the determination is performed, the ECM 30 first applies a bandpass filter for extracting the fluctuation component with the period T to the output from the intake manifold pressure sensor 38 that is acquired in step S140. Subsequently, the ECM 30 determines whether or not an amplitude S of the output from the intake manifold pressure sensor 38 to which the bandpass filter is applied exceeds a stuck-closing determination value X. In a case where the amplitude S exceeds the stuck-closing determination value X, the ECM 30 determines that the fluctuation component with the period T is included in the output from the intake manifold pressure sensor 38. Further, in a case where the amplitude S is equal to or less than the stuck-closing determination value X, the ECM 30 determines that the fluctuation component with the period T is not included in the output from the intake manifold pressure sensor 38.

After the diagnosis in step S160 or step S170, the ECM 30 instructs the WGV 25 to keep a given opening degree in step S180, similarly to step S110. After that, when the activation of the catalyzer 19 is completed (S190: YES), the ECM 30 ends the process of the catalyst early activation control at cold start at this time. Subsequently, the ECM 30 executes an opening degree control on the WGV 25 based on the driving condition of the engine 10.

In the present embodiment, the determination on whether or not the activation of the catalyzer 19 is completed is performed based on a start-up coolant temperature, the intake-air temperature THA, and an accumulated intake amount. The start-up coolant temperature is a value of the engine water temperature THW at the start of the engine 10. The accumulated intake amount is an accumulation value of the intake-air flow rate GA after the start of the engine 10. As described above, the ECM 30 controls the fuel injection amount such that the air-fuel ratio of the fuel-air mixture to be burnt in the combustion chamber 11 reaches the theoretical air-fuel ratio. Accordingly, the amount of heat of exhaust gas to be discharged from the combustion chamber 11 is larger as the intake-air flow rate GA is larger. On this account, the amount of heat that the catalyzer 19 receives from the exhaust gas after the start of the engine 10 is found based on the accumulated intake amount. Meanwhile, the catalyst temperature of the catalyzer 19 at the start of the engine 10 is found based on the start-up coolant temperature. Further, the heat dissipation amount from the catalyzer 19 to the external air is larger as the temperature difference between the catalyzer 19 and the external air is larger. The temperature of the external air is found based on the intake-air temperature THA. Accordingly, whether or not the catalyst reaches a temperature necessary for activation can be determined based on the start-up coolant temperature, the intake-air temperature THA, and the accumulated intake amount.

Operations and Effects of Embodiment

Next will be described operations and effects of the present embodiment. Note that, in the following description, an end surface of the catalyzer 19 on the upstream side in the exhaust-gas flowing direction is described as a front end of the catalyzer 19.

Figure 3:
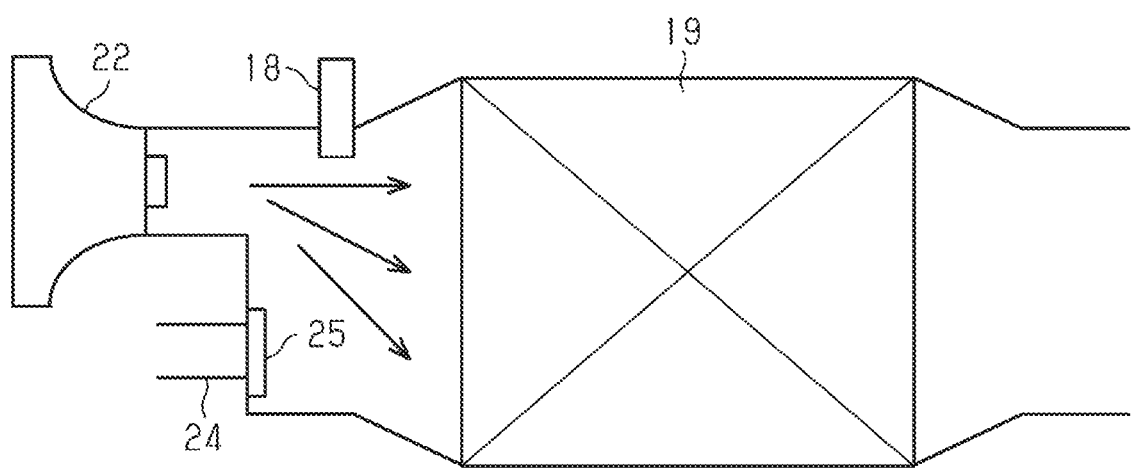
FIG. 3 is a view illustrating the flow of exhaust gas on the downstream side from a turbine when a wastegate valve is closed in an engine to which the engine control device is applied.

FIG. 3 illustrates the flow of the exhaust gas on the downstream side from the turbine 22 at the time when the WGV 25 is closed. When the WGV 25 is closed, the exhaust gas flows through the turbine 22. The flow of the exhaust gas passing through the turbine 22 becomes a swirl flow such that the exhaust gas is diffused in a wide range. On that account, at this time, the exhaust gas is blown against the wide range of the front end of the catalyzer 19.

Figure 4:
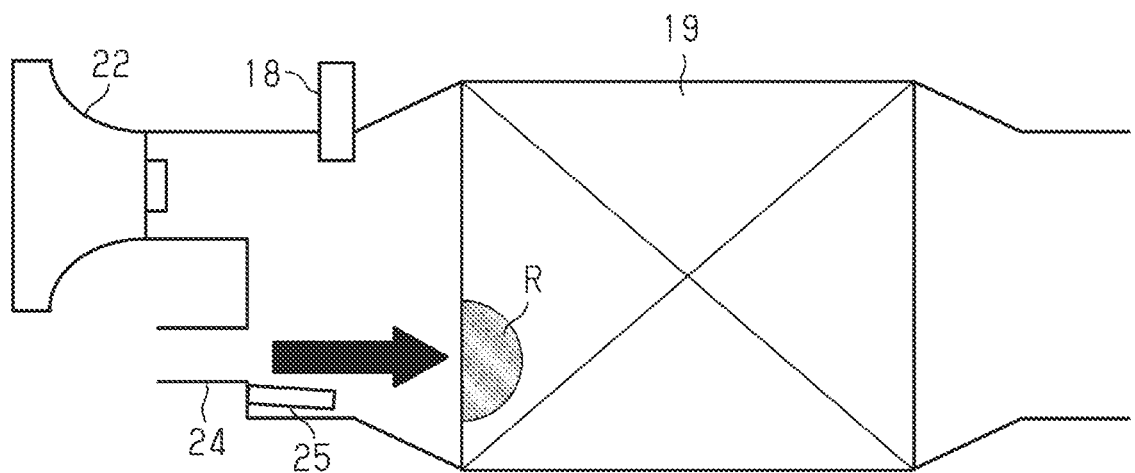
FIG. 4 is a view illustrating the flow of exhaust gas on the downstream side from the turbine when the wastegate valve is opened in the engine to which the engine control device is applied.

FIG. 4 illustrates the flow of the exhaust gas on the downstream side from the turbine 22 at the time when the WGV 25 is opened. At this time, most of the exhaust gas flows through the bypass passage 24. The flow of the exhaust gas passing through the bypass passage 24 becomes a jet flow. On that account, at this time, the exhaust gas is intensively blown against part of the front end of the catalyzer 19. Accordingly, in a case where the WGV 25 is opened, a part where the catalyst is activated is formed in the catalyzer 19 earlier than a case where the WGV 25 is closed. Hereby, the catalyst early activation control shortens a period during which the catalyzer 19 cannot clean the exhaust gas after the cold start of the engine 10.

FIG. 5A illustrates the transition of the opening degree of the WGV 25 during execution of the catalyst early activation control. Further, FIG. 5B illustrates the transition of the output from the intake manifold pressure sensor 38 after the bandpass filter is applied to the intake manifold pressure sensor 38. In the case of FIGS. 5A, 5B, the ECM 30 executes the catalyst early activation control during a period from time t0 to time t3. Further, in the case of FIGS. 5A, 5B, the ECM 30 performs the diagnosis process during a period from t1 to t2 during the execution of the catalyst early activation control. Note that respective transitions of the opening degree and the output in a case where the WGV 25 is not stuck are indicated by continuous lines in FIGS. 5A, 5B. Further, respective transitions of the opening degree and the output in a case where the WGV 25 is stuck are indicated by broken lines in FIGS. 5A, 5B.

At time t0 at which the catalyst early activation control is started, the ECM 30 instructs the WGV 25 to be opened. In FIGS. 5A, 5B, the WGV 25 is instructed to be opened at the fully-opened opening degree. When the diagnosis process is started at time t1 after that, the ECM 30 instructs the WGV 25 to repeat opening and closing with a given period T. In FIGS. 5A, 5B, the WGV 25 is instructed to repeat opening and closing between the fully-closed opening degree and the fully-opened opening degree.

When the opening degree of the WGV 25 is changed, the exhaust-gas flow rate of the turbine 22 changes, so that supercharging efficiency of the compressor 21 changes. Due to the change in the supercharging efficiency, the intake manifold pressure PM changes. Accordingly, when the WGV 25 repeats the opening and closing as instructed by the ECM 30 during the diagnosis process, fluctuations with the same period T as the opening and closing of the WGV 25 occur in the intake manifold pressure PM. In the meantime, in a case where the WGV 25 is stuck and does not repeat the opening and closing as instructed, no fluctuation with the same period T as the instructed opening and closing occurs in the intake manifold pressure PM. Accordingly, the ECM 30 can diagnose whether or not the WGV 25 is stuck, based on whether or not a fluctuation component with the period T is included in the output from the intake manifold pressure sensor 38 during the diagnosis process.

Here, the following discusses a case where whether or not the WGV 25 is stuck is diagnosed by the following method during the catalyst early activation control. The ECM 30 instructs the WGV 25 to be closed during the catalyst early activation control. Based on a change amount in the intake manifold pressure PM after the WGV 25 is instructed to be closed, whether or not the WGV 25 is stuck is diagnosed. In a case where the WGV 25 is closed as instructed at this time, the exhaust-gas flow rate in the turbine 22 increases, so that the intake manifold pressure PM increases. In the meantime, in a case where the WGV 25 is stuck and is not closed as instructed, the exhaust-gas flow rate in the turbine 22 does not change, so that the intake manifold pressure PM does not change. Accordingly, it is also possible to diagnose whether or not the WGV 25 is stuck even by the above method.

However, such a diagnosis method has the following problem. It takes some time until a change in the opening degree of the WGV 25 is reflected on the intake manifold pressure PM. In the meantime, the intake manifold pressure PM during the operation of the engine 10 also fluctuates due to a factor other than the change in the opening degree of the WGV 25, e.g., the opening and closing of an intake valve. Accordingly, in the above method, it is necessary to keep the WGV 25 to be closed for a certain period of time so that an obviously large change occurs in the intake manifold pressure PM as compared with fluctuations caused due to other factors. While the WGV 25 is closed, blowing of the exhaust gas against an activation promoted part in the catalyst early activation control is stopped. On this account, in the above method, the activation of the catalyzer 19 by the catalyst early activation control is easily delayed.

In contrast, in the present embodiment, the ECM 30 diagnoses whether or not the WGV 25 is stuck, based on whether or not the fluctuation component with the same period T as the period of the opening and closing of the WGV 25 is included in the output from the intake manifold pressure sensor 38. The presence or absence of such a fluctuation component can be checked even when the change amount of the intake manifold pressure PM to be caused due to the opening and closing of the WGV 25 is not so large. Accordingly, by setting a short time as the period T for the opening and closing of the WGV 25 in the diagnosis process, it is possible to prevent blowing of the exhaust gas against the activation promoted part from stopping for a long period of time. Thus, in the diagnosis method of the present embodiment, an activation delay due to the diagnosis can hardly occur in the catalyzer 19.

With the engine control device of the present embodiment, the following effects can be yielded.

(1) It is possible to diagnose whether or not the WGV 25 is stuck, during the execution of the catalyst early activation control, while an activation delay in the catalyzer 19 is restrained.

(2) The diagnosis is performed during the catalyst early activation control to be executed just after the start of the engine 10. Accordingly, it is possible to check the occurrence of valve stuck closing in the WGV 25 in a short time from the start of the engine 10.

Second Embodiment

Next will be described a second embodiment of the engine control device in detail with reference to FIGS. 6A to 6C. Note that the engine control device of the present embodiment is provided in a hybrid electric vehicle including a generator motor 40 drivingly connected to the engine 10. The ECM 30 in the present embodiment is configured to control a driving force to drive the hybrid electric vehicle through torque adjustment of both of the engine 10 and the generator motor 40.

FIG. 6A illustrates the transition of the opening degree of the WGV 25 during the execution of the catalyst early activation control by the engine control device of the present embodiment. Further, FIG. 6B illustrates the transition of the intake-air flow rate GA during the execution of the catalyst early activation control. Further, FIG. 6C illustrates the transition of MG torque during the execution of the catalyst early activation control. Note that the MG torque indicates the torque of the generator motor 40.

In the case of FIGS. 6A to 6C, the ECM 30 starts the catalyst early activation control at time t10 by instructing the WGV 25 to be opened. Then, the ECM 30 performs the diagnosis process of diagnosing on whether or not the WGV 25 is stuck closed, based on the output from the air-fuel-ratio sensor 18 during a period from t11 to t12 after t0. Further, in the case of FIGS. 6A to 6C, the ECM 30 ends the catalyst early activation control at time t13 after time t12 by instructing the WGV 25 to be closed. As illustrated in FIG. 6B, during the period from time t11 to time t12 during which the diagnosis process is performed, the ECM 30 executes an intake-amount increase control such that the intake amount of the engine 10 is increased.

When the intake-amount increase control is executed, a change in the intake manifold pressure PM along with a change in the opening degree of the WGV 25 increases. Accordingly, the engine control device of the present embodiment yields such an effect that the accuracy in diagnosis on whether or not the WGV 25 is stuck closed improves.

Note that the brake torque of the engine 10 increases when the intake-air flow rate GA is increased. In view of this, during the execution of the intake-amount increase control, the ECM 30 executes a torque absorption control such that an increased amount in the brake torque of the engine 10 is absorbed by decreasing the MG torque as illustrated in FIG. 6C. Hereby, the ECM 30 prevents an increase in the driving force or the occurrence of blow-up of the engine revolution speed along with the execution of the intake-amount increase control.

Third Embodiment

Next will be described a third embodiment of the engine control device in detail with reference to FIG. 7.

Figure 7:
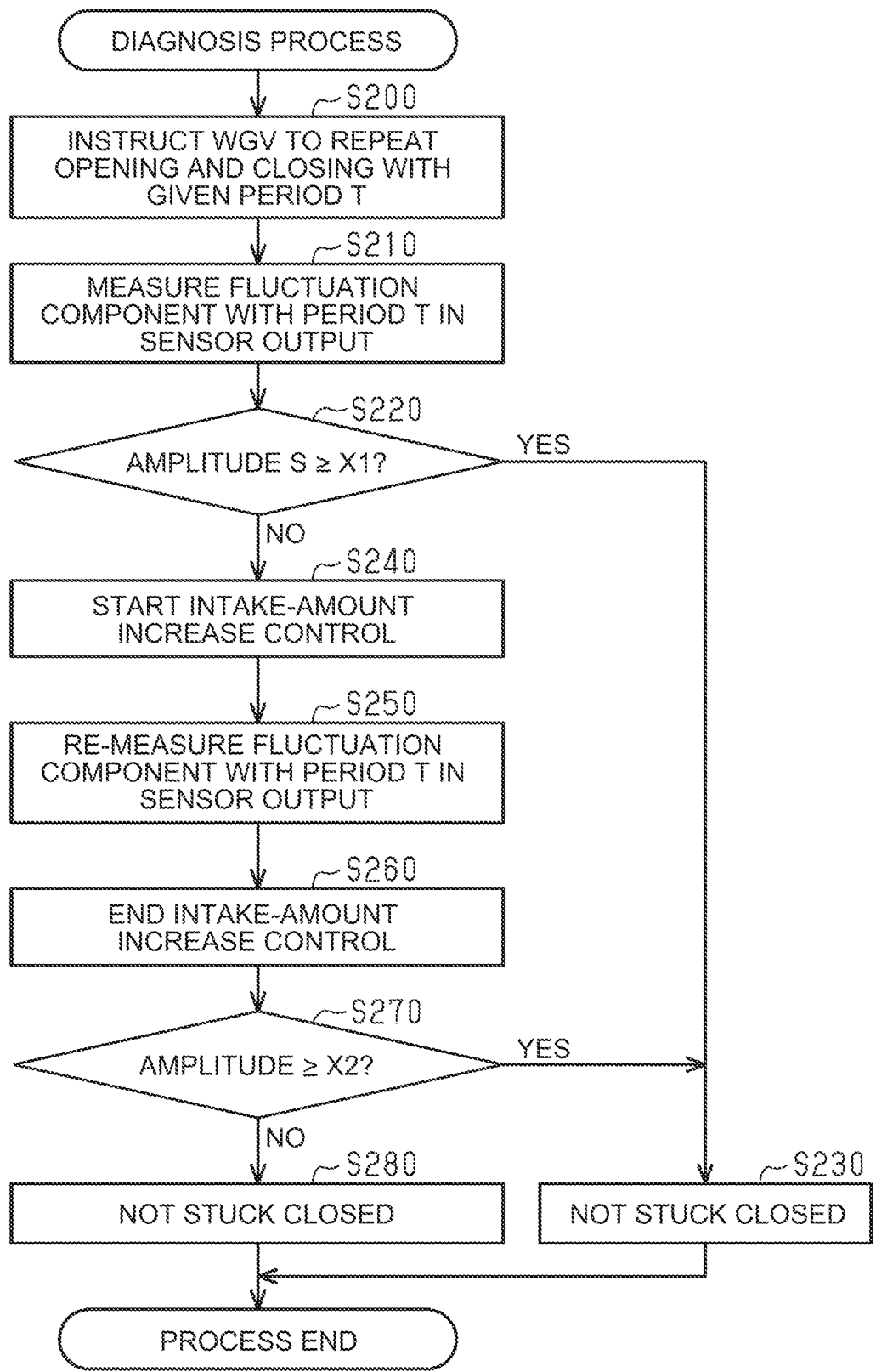
FIG. 7 is a flowchart illustrating the procedure of a diagnosis process to be executed by an engine control device according to a third embodiment.

FIG. 7 illustrates the procedure of a diagnosis process in the engine control device according to the present embodiment. The series of processes illustrated in FIG. 7 are processes to be executed instead of the processes of steps S130 to S160 in FIG. 2. Accordingly, the ECM 30 starts the diagnosis process in FIG. 7 in response to establishment of a diagnosis execution condition after the start of the catalyst early activation control. Then, when the ECM 30 ends the process in FIG. 7, the ECM 30 advances the process to step S180 in FIG. 2.

When the diagnosis process is started, the ECM 30 first instructs the WGV 25 to repeat opening and closing with a given period T in step S200. Subsequently, in step S210, the ECM 30 measures the amplitude S of a fluctuation component with the period T in the output from the intake manifold pressure sensor 38. Then, in step S220, the ECM 30 determines whether or not the amplitude S measured in step S210 is equal to or more than a given first stuck-closing determination value X1. In a case where the amplitude S is equal to or more than the first stuck-closing determination value X1 (S220: YES), the ECM 30 diagnoses, in step S230, that the WGV 25 is stuck closed, and the ECM 30 ends the process of FIG. 7.

Further, in a case where the amplitude S is less than the first stuck-closing determination value X1 (S220: NO), the ECM 30 starts the intake-amount increase control in step S240. After that, in step S250, the ECM 30 measures again the amplitude S of a fluctuation component with the period T in the output from the intake manifold pressure sensor 38, and then, the ECM 30 ends the intake-amount increase control in step S260.

Subsequently, in step S270, the ECM 30 determines whether or not the remeasured amplitude S is equal to or more than a given second stuck-closing determination value X2. The second stuck-closing determination value X2 may be set to the same value as the first stuck-closing determination value X1 or may be set to a different value. In a case where the remeasured amplitude S is equal to or more than the second stuck-closing determination value X2 (S270: YES), the ECM 30 diagnoses, in step S220, that the WGV 25 is stuck closed, and the ECM 30 ends the process of FIG. 7. In the meantime, in a case where the remeasured amplitude S is less than the second stuck-closing determination value X2 (S270: NO), the ECM 30 diagnoses, in step S280, that the WGV 25 is not stuck closed, and the ECM 30 ends the process of FIG. 7.

Note that, in the present embodiment, the processes of steps S200 to S220 in FIG. 7 correspond to a first diagnosis process. Further, the processes of steps S240 to S270 in FIG. 7 correspond to a second diagnosis process.

Operations and Effects of Embodiment

As described above, by executing the intake-amount increase control during the execution of the diagnosis process, it is possible to improve the accuracy in diagnosis on whether or not the WGV 25 is stuck closed. However, in a case where the intake air is increased in amount in a state where the catalyst is not activated right after the start of the engine 10, the exhaust performance of the engine 10 might decrease.

In contrast, in the present embodiment, at the time of performing the diagnosis process, the ECM 30 first diagnoses whether or not the WGV 25 is stuck in a state where the intake-amount increase control is not performed. After that, the ECM 30 executes the intake-amount increase control and then performs the diagnosis again. Even in a case where a stuck state is not detected in the first diagnosis, the stuck state may be detected in the re-diagnosis. Further, at the time of the re-diagnosis, a given time passes from the start of the engine 10. Accordingly, poor exhaust performance due to an increase in the amount of the intake air is hard to occur. On that account, the accuracy in the diagnosis is improved without worsening the exhaust performance.

Modifications

Further, the above embodiments can be also carried out by adding changes as stated below. The present embodiment and the following modifications can be carried out in combination as long as they do not cause any technical inconsistencies.

In the above embodiments, the ECM 30 determines whether or not the fluctuation component with the same period T as the period of the opening and closing of the WGV 25 is included in the output from the intake manifold pressure sensor 38, based on the amplitude S of the output from the intake manifold pressure sensor 38 to which the bandpass filter is applied. Whether or not the fluctuation component is included in the output from the intake manifold pressure sensor 38 may be determined by methods other than the above.

In the above embodiments, whether or not the WGV 25 is stuck is diagnosed by use of the output from the intake manifold pressure sensor 38. However, the diagnosis may be performed by use of the output from the boost pressure sensor 37. In that case, the boost pressure sensor 37 has a configuration corresponding to the intake pressure sensor.

In the above embodiments, the WGV 25 is kept at the fully-opened opening degree in the catalyst early activation control. However, the WGV 25 may be kept at the intermediate opening degree.

In the above embodiment, during the diagnosis process, the WGV 25 is opened and closed within an opening degree range from the fully-opened opening degree to the fully-closed opening degree. The WGV 25 may be opened and closed in an opening degree range other than that. For example, the opening and closing of the WGV 25 during the diagnosis process may be performed within an opening degree range from the fully-opened opening degree to the intermediate opening degree.

In the second embodiment, the torque absorption control is executed such that an increased amount in the brake torque of the engine 10 due to the intake-air increase control is absorbed by adjustment of the MG torque. Instead of executing the torque absorption control, an increased amount in the brake torque due to the intake-amount increase control may be absorbed by a decrease in the brake torque due to retardation of an ignition timing, or the like. Further, the torque absorption control may be executed such that an increased amount in the brake torque of the engine 10 due to the intake-amount increase control is only partially absorbed. Even in such a case, it is possible to restrain an increase in the driving force or the occurrence of blow-up of the engine revolution speed along with the execution of the intake-amount increase control. Further, if no problem is caused when the increased amount in the brake torque of the engine 10 due to the intake-amount increase control is just reflected on the driving force to drive the vehicle, the intake-amount increase control may be executed without executing a control to handle the increase in the brake torque.

In a state where the engine 10 is driven with high output, and the flow rate of the exhaust gas is high, the catalyzer 19 can be activated within an allowable time after the cold start even without the execution of the catalytic activation control in some cases. In view of this, in a case where the flow rate of the exhaust gas exceeds a given rate after the completion of the diagnosis process, the catalyst early activation control may be stopped or canceled at that point. Further, in a case where the flow rate of the exhaust gas decreases after the catalyst early activation control is stopped, the catalyst early activation control may be started again.

Details of the determination condition to determine whether or not the catalyzer 19 is activated, the determination condition to determine whether or not the activation is completed, and the diagnosis execution condition may be changed appropriately.

What is claimed is:

1. An engine control device for controlling an engine including
a combustion chamber in which combustion of fuel-air mixture is performed,
an intake passage as an introduction passage for intake air to the combustion chamber,
an exhaust passage as a discharge passage for exhaust gas from the combustion chamber, a turbocharger including a turbine provided in the exhaust passage and a compressor provided in the intake passage,
a bypass passage branching off from the exhaust passage at a part of the exhaust passage on an upstream side from the turbine and merging with the exhaust passage at a part of the exhaust passage on a downstream side from the turbine,
a wastegate valve configured to open and close the bypass passage,
a catalyzer configured to clean the exhaust gas, the catalyzer being provided in a part of the exhaust passage, the part being on the downstream side from a merging position where the bypass passage merges with the exhaust passage, and
an intake pressure sensor configured to detect a pressure of the intake air in a part of the intake passage on the downstream side from the compressor, the engine control device comprising:
a processor configured to execute
a catalyst early activation control at cold start of the engine such that the catalyzer is promoted to be activated by opening the wastegate valve; and
a diagnosis process of, during execution of the catalyst early activation control, instructing the wastegate valve to repeat opening and closing with a given period and diagnosing whether or not the wastegate valve is stuck, based on whether or not a fluctuation component with the given period is included in output from the intake pressure sensor during the instruction.

2. The engine control device according to claim 1, comprising a bandpass filter configured to extract a fluctuation component with the same period as the period of the opening and closing from the output from the intake pressure sensor, wherein the diagnosis process is performed to diagnose whether or not the wastegate valve is stuck, based on whether or not an amplitude of the output from the intake pressure sensor to which the bandpass filter is applied is equal to or more than a given determination value.

3. The engine control device according to claim 1, wherein the processor is configured to execute an intake-amount increase control during execution of the diagnosis process such that an intake amount of the engine is increased.

4. The engine control device according to claim 3, wherein:
the diagnosis process includes a first diagnosis process of diagnosing whether or not the wastegate valve is stuck in a state where the intake-amount increase control is not executed, and a second diagnosis process of diagnosing whether or not the wastegate valve is stuck in a state where the intake-amount increase control is executed; and
the second diagnosis process is performed after the first diagnosis process.

5. The engine control device according to claim 3, wherein:
the engine control device is provided in a hybrid electric vehicle including a generator motor drivingly connected to the engine;
the engine control device controls a driving force to drive the hybrid electric vehicle through torque adjustment of both of the engine and the generator motor; and
the processor is configured to execute a torque absorption control during execution of the intake-amount increase control such that an increased amount in torque of the engine due to the intake-amount increase control is at least partially absorbed by the torque adjustment of the generator motor.

* * * * *